United States Patent [19]

Krejci

[11] 3,726,964
[45] Apr. 10, 1973

[54] PROCESS FOR THE PRODUCTION OF CARBON BLACK

[75] Inventor: Joseph C. Krejci, Phillips, Tex.

[73] Assignee: Phillips Petroleum Company, Bartlesville, Okla.

[22] Filed: Nov. 18, 1970

[21] Appl. No.: 90,585

[52] U.S. Cl. .................423/455, 23/259.5, 222/566, 423/450
[51] Int. Cl. ..............................................C09c 1/50
[58] Field of Search........................23/209.4, 209.6, 23/259.5; 423/450, 455, 456, 458

[56] References Cited

UNITED STATES PATENTS

| 3,003,855 | 10/1961 | Heller et al. | 23/209.4 |
|---|---|---|---|
| 3,490,870 | 1/1970 | Deland | 23/209.4 |
| 2,779,665 | 1/1957 | Heller | 23/209.4 X |
| 2,917,370 | 12/1959 | Edminster et al. | 23/209.4 |
| 2,895,804 | 7/1959 | Heller | 23/209.4 |
| 3,560,164 | 2/1971 | Venable | 23/259.5 |
| 3,253,890 | 5/1966 | Deland et al. | 23/209.6 |
| 3,100,689 | 8/1963 | Mason | 23/209.6 |

Primary Examiner—Edward J. Meros
Attorney—Young and Quigg

[57] ABSTRACT

Carbon black is produced by the pyrolytic decomposition of a hydrocarbon feed with hot combustion gases, at least a portion of the hydrocarbon feed being introduced into the reactor at supersonic velocity. The process is preferably conducted in a vertical reactor by injecting the hydrocarbon feedstream downward into the reactor into the hot combustion gases and the reaction mass passed through the carbon black formation zone at a velocity of about 3.5 to about 11 feet per second, a temperature of about 2,400° F to about 2,500° F, and a pressure of about 15 psia to about 30 psia. Nozzels for introducing the hydrocarbon feed at supersonic velocity or a combination of supersonic and subsonic velocities are disclosed.

7 Claims, 6 Drawing Figures

PATENTED APR 10 1973 3,726,964

INVENTOR.
J. C. KREJCI

BY
Young & Quigg

ATTORNEYS

PROCESS FOR THE PRODUCTION OF CARBON BLACK

This invention relates to carbon black apparatus.

In one of its more specific aspects, this invention relates to the injection of hydrocarbon feed into carbon black furnaces.

There has recently been invented a process for the production of carbon black by the pyrolytic decomposition of a hydrocarbon feed in which feedstock is brought into contact with hot combustion gases and dispensed as a highly concentrated mass of finely divided particles. The feedstock is brought to a temperature within the lower range of carbon black forming temperatures and passed as a hot concentrated mass through the reaction zone at low velocities to produce an exceptionally large particle, low structure black.

This process is preferably carried out in a vertical reactor by injecting the hydrocarbon feedstream downward into the reactor into the hot combustion gases, the hot combustion gases being produced by the oxidation of a fuel with an oxidant, preferably air, the air being supplied in an amount within the range of about 240 to 450 SCF per gallon of hydrocarbon feed. The reaction mass formed of the feed and combustion gases is conducted through the reaction zone at a velocity within the range of about 3.5 to about 11 feet per second at a temperature within the range of from about 2,400° F. to about 2,500° F. More generally, the reaction is carried out at reactor velocities of less than about 15 feet per second and at temperatures within about the lower 15 percent of the range of carbon black formation temperatures. The preferred reactor operating pressures are from about 15 psia to about 30 psia.

Much of the success of the process depends upon the speed with which the preheated hydrocarbon feed is brought within the prescribed operating conditions, that is, how rapidly the hydrocarbon feed can be formed into a concentrated mass within the combustion gases at the desired velocity and temperature.

It has now been discovered that these objects can be accomplished by introducing the hydrocarbon feed into the reactor at supersonic velocities. This invention provides the method and apparatus for doing so and while particularly suitable for use in the aforementioned process, it is also usable in all processes in which carbon black is produced by pyrolytic decomposition of a fuel.

According to this invention there is provided a method of producing carbon black which comprises introducing a hydrocarbon feed into a mass of hot combustion gases to form a reaction mass, the feed being introduced at a velocity greater than sonic velocity under reactor conditions of temperature and pressure, to disperse the feed in the hot combustion gases as a concentrated mass of finely divided particles and conducting the reaction mass through the reactor under the aforesaid conditions.

According to this invention there is provided a nozzle for the injection of a hydrocarbon stream into a carbon black furnace which comprises at least one port adapted for emitting a hydrocarbon feed at a velocity greater than sonic velocity and, preferably, at least one port adapted for emitting a hydrocarbon feed at a velocity less than sonic velocity.

The various embodiments of the nozzle disclosed herein facilitate the method of this invention, in part by establishing shock waves at the exit from the nozzles, the shock waves acting to disperse the hydrocarbon feed and to enable it to be brought rapidly to the optimum conditions under which it is desired to conduct the pyrolytic decomposition.

The method and apparatus of this invention will be better understood if explained in conjunction with the attached drawings in which various embodiments of the nozzle are depicted.

Figure 1:
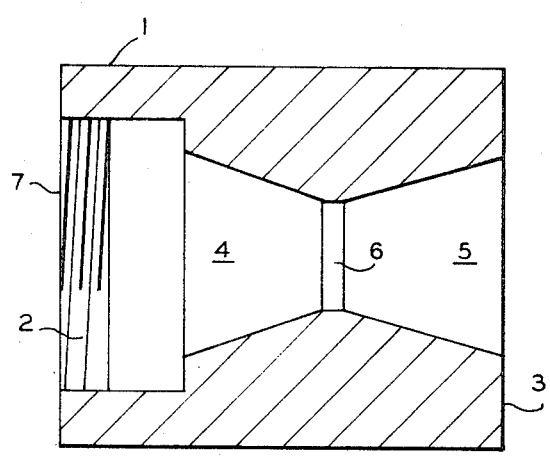
FIGS. 1 and 2 depict a nozzle comprised of a single port, the discharge through the port being supersonic.
Figure 2:
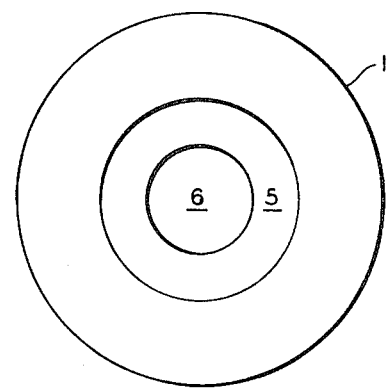

Referring now to FIGS. 1 and 2, there is shown nozzle 1 adapted at its inlet end 7 with suitable means, for example, threads 2, for attachment to the feed introducing conduit and having an outlet end 3. The passageway through the nozzle is comprised of two sections 4 and 5, section 4 converging and section 5 diverging from throat 6. Both the convergence of section 4 and the divergence of section 5 can be at any angle while producing supersonic flow although a convergence of from about 38° to 40° and a divergence of about 30° have been found satisfactory. Any diametric relationship can be used for sections 4 and 5 which provide a supersonic velocity of the hydrocarbon feed from outlet end 3.

Figure 3:
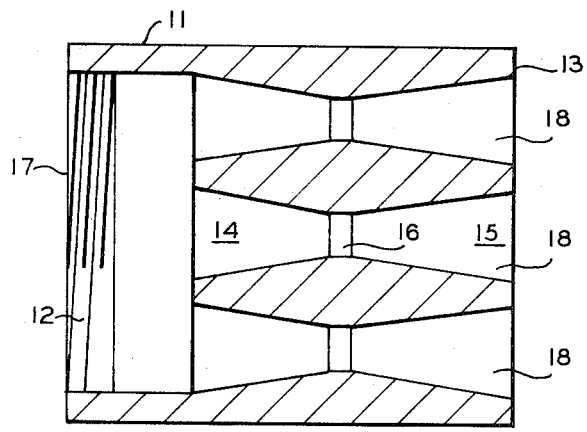
FIGS. 3 and 4 depict a nozzle comprised of a plurality of ports, the discharge through all ports being supersonic.
Figure 4:
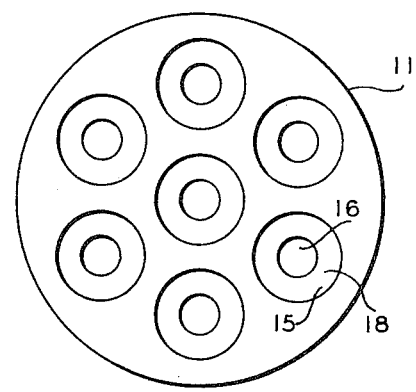

Referring now to FIGS. 3 and 4, there is shown nozzle 11 adapted at its inlet end 17 with suitable means, for example, threads 12, for attachment to the feed introductory conduit, and having an outlet end 13. A plurality of passageways 18 are formed of sections 14 and 15, these being of converging and diverging configuration, respectively. Throats 16 are located between sections 14 and 15. In all aspects, except in that a plurality of passageways exist through the nozzle, it is comparable to the nozzle of FIG. 1.

Any number of passageways can be employed, these passageways being disposed in any configuration but preferably being comprised of at least one centrally-disposed passageway encircled by a ring of passageways. Similarly, all passageways can be of equal dimensions or the passageways can be of different dimensions to impart different velocities to the fluid passing through the passageways, with all velocities being supersonic.

Figure 5:
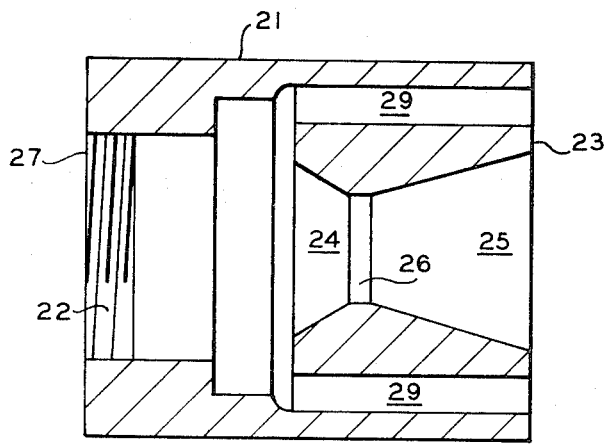
FIGS. 5 and 6 depict a nozzle comprised of a port centrally positioned to a plurality of encircling ports, the velocity through the centrally positioned port being supersonic and the velocity through the encircling ports being subsonic.
Figure 6:
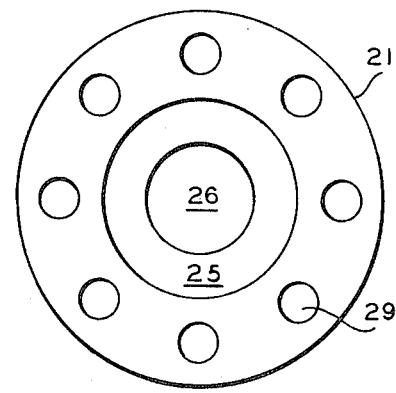

Referring now to FIGS. 5 and 6, there is shown nozzle 21 adapted at its inlet end 27 with suitable means, for example, threads 22, for attachment to the feed introductory conduit and having an outlet end 23. In this nozzle there exists a central passageway comprised of converging and diverging sections 24 and 25 and throat 26 through which supersonic velocity is imparted to the hydrocarbon feed and a series of passageways 29 through which velocities less than supersonic are imparted to a portion of the hydrocarbon feed. If desired, an annulus can be substituted for the series of passageways. Also, if desired, a centrally positioned opening can be used for that feed entering at subsonic velocities and at least one peripherally-positioned passageway can be employed to introduce feed at supersonic velocities. The annulus or the individual passageways can be positioned parallel to the centerline of the nozzle or at an angle thereto.

The method of this invention produces, under the predefined operating conditions, carbon blacks which are significantly different than those blacks produced by multistream nozzles emitting at less than supersonic velocities.

These nozzles shown in FIGS. 1 and 5 of the drawing were employed in the production of a large particle carbon black, and a multiport subsonic-emitting nozzle was employed for comparison purposes in a vertical reactor in a best mode of practicing the invention. Air as oxidant was introduced into the reactor through its circumferential periphery upstream at about the locus of the discharge of the feed nozzle and also downstream thereof at a distance approximately equal to the diameter of the reactor. The reactor pressure was 19 psia in all runs.

Results were as follows:

| Nozzle | FIG. 1 | FIG. 5 | Subsonic Multistream |
|---|---|---|---|
| Hydrocarbon Feed, GPH | 96 | 93 | 88 |
| Atomizing Air, SCFH | 6,000 | 6,000 | 6,000 |
| Axial Air, SCFH | 5,000 | 5,000 | 5,000 |
| Circumferential Air, Upstream, SCFH | 15,000 | 15,000 | 15,000 |
| Circumferential Air, Downstream, SCFH | 15,000 | 15,000 | 15,000 |
| Circumferential Gas Rate, Upstream, SCFH | 1,000 | 1,000 | 1,000 |
| Product Analysis | | | |
| Photelometer | 90 | 89 | 92 |
| $N_2$ Surface Area, $m^2/g$ | 16.2 | 20.2 | 22.6 |
| Structure, cc/100 gm (DPB) | 32 | 29 | 30 |
| Yield, lb./gal. | 5.06 | 4.67 | 4.72 |
| Carbon Deposit on Reactor | None | None | Film |

Nozzle of FIG. 1 had convergent included angle of 38° and a divergent included nozzle of 30°. Nozzle of FIG. 5 had a convergent included angle of 60° and a divergent included angle of 30°.

The above data illustrate the operability of the method and apparatus of this invention. They further indicate that the employment of the supersonic nozzles was carried out without carbon deposition on the reactor whereas, in contrast, carbon was deposited on the reactor when employing the subsonic nozzle under otherwise substantially identical conditions. Accordingly, it is seen that operations with the supersonic nozzles will extend the operating cycle of the system.

It will be evident from the foregoing that various modifications can be made to this invention. Such, however, are considered as being within the scope of the invention.

What is claimed is:

1. A process for the production of carbon black by the pyrolytic decomposition of a hydrocarbon feed by contacting said feed with hot combustion gases which comprises:

a. introducing a hydrocarbon feed into a mass of hot combustion gases to form a reaction mass, at least a first portion of said feed being introduced at a velocity less than sonic velocity and at least a second portion of said feed being introduced at a velocity greater than sonic velocity to disperse said feed in said hot combustion gases as a concentrated mass of finely divided particles, one of said portions being introduced as a plurality of streams and one of said portions being introduced as a single stream centrally of said plurality of streams, said hot combustion gases being produced by the oxidation of a fuel with an oxidant;

b. conducting said reaction mass through a carbon black formation zone under carbon black forming conditions to form carbon black; and, c. recovering said carbon black.

2. The process of claim 1 in which said first portion is introduced as a plurality of streams.

3. The process of claim 1 in which said second portion is introduced as a plurality of streams.

4. The process of claim 1 in which said oxidant is air supplied in an amount within the range of from about 240 to 450 SCF per gallon of said feed.

5. The process of claim 1 in which said reaction mass is passed through said carbon black formation zone at a velocity within the range of from about 3.5 to about 11 feet per second at a temperature within the range of from about 2,400° F to about 2,500° F.

6. The process of claim 5 in which said second portion is introduced as a single stream.

7. The process of claim 5 in which said first portion is introduced as a single stream.

* * * * *